3,409,385
ANTHRAQUINONE DYED POLYPROPYLENE FIBERS

Joseph W. Dehn, Jr., Great Neck, and Harold J. Kuhefuss and Paul Resnick, Brooklyn, N.Y., assignors to Interchemical Corporation, New York, N.Y., a corporation of Ohio
No Drawing. Filed Sept. 21, 1964, Ser. No. 398,046
3 Claims. (Cl. 8—39)

ABSTRACT OF THE DISCLOSURE

Polypropylene dyed with 1-(2′,4′,6′-trimethylanilino)-4-hydroxyanthraquinone or with 1-(2′,4′,6′-triethylanilino)-4-hydroxyanthraquinone.

---

This invention relates to 1-(2′,4′,6′-trimethylanilino)-4-hydroxyanthraquinone and 1-(2′,4′,6′-triethylanilino)-4-hydroxyanthraquinone as dyes for polypropylene fibers.

These compounds were evaluated in comparison with about 60 related anthraquinone compounds to determine their value as dyes for polypropylene fibers.

Currently available disperse dyes leave something to be desired in affinity and fastness, consequently much work is being done on indirect methods, such as surface treatments and incorporation of metals or other materials in the polypropylene substance. Given good affinity, fastness, etc., disperse dyes would have the merit of greater simplicity and applicability.

The instant invention provides two disperse dyes having good affinity for ordinary polypropylene fibers and which display good fastness when dyed thereon.

EXAMPLE 1

1-(2′,4′,6′-trimethylanilino)-4-hydroxyanthraquinone 14.4 g. (60 millimoles) of quinizarin, 3.60 g. (15 millimoles) of leuco quinizarin, 9.0 g. (146 millimoles) of boric acid, 125 ml. of methyl cellosolve, and 12.2 g. (90 millimoles) of 2,4,6-trimethylaniline were heated together at 82° C. for one hour, brought up to reflux temperature in another hour, and heated at reflux (118° C.) for 25 hours. The cooled mixture was filtered and washed with absolute ethanol. The moist filter cake (15 g.) was extracted with absolute ethanol in a Soxhlet apparatus. The violet brown material obtained was boiled in 0.8% sodium hydroxide solution for 30 minutes, filtered, washed to neutrality, and dried. When recrystallized from ethanol; its melting point was 187°–189° C.

EXAMPLE 2

1-(2′,4′,6′-triethylanilino)-4-hydroxyanthraquinone 5.76 g. (24 millimoles) of quinizarin, 1.44 g. (6 millimoles) of leuco quinizarin, 3.7 g. (60 millimoles) of boric acid, 50 ml. of methyl cellosolve, and 6.4 g. (36 millimoles) of 2,4,6-triethylaniline were refluxed together for 74 hours at 120°–123° C. 40 ml. more of solvent were added and the violet mixture was suction filtered at nearly its boiling temperature and the filter cake washed with acetone. Distilled water was added to the filtrate dropwise, producing a gummy precipitate. The mixture was acidified to a strength of about 1 normal with hydrochloric acid and stirred overnight. A solid precipitate was thus thrown down. The filter cake was treated with 0.8% sodium hydroxide solution at the boil for 30 minutes, filtered, and washed until neutral to litmus. The dried violet-black filter cake had a melting point of about 123° C. Recrystallized from absolute ethanol, it showed a melting point of 132°–136° C.

Analysis gave C=77.84%; H=6.10%; N=3.55% as compared with the theoretical C=78.17%; H=6.31%; N=3.51% as calculated for $C_{26}H_{25}NO_3$.

2,4,6-triethylaniline may be prepared by nitration of 1,3,5-triethylbenzene to give 2,4,6-triethyl-1-nitrobenzene. Subsequent hydrogenation via a palladium catalyst in ethyl alcohol solution gives the 2,4,6-triethylaniline. 2,4,6-trimethylaniline is commercially available.

The compound of Example 1 dyed polypropylene fabric violet; its affinity for the fibers and its fastness being at least equal to those of 1-anilino-4-hydroxyanthraquinone, a commercially available violet dyestuff. The violet compound of Example 2 shows a much greater affinity for polypropylene than the 2 above-mentioned dyes. Its build-up is also very pronounced in going from ½% to 2% dyeings.

Dyeings on polypropylene cloth were made by the following process, recommended by the cloth manufacturer. 5 g. of the cloth were scoured for 30 minutes at 70° C. in a solution containing 5 cc. of 1.0% "Sulframin AB–40" solution, 1.25 cc. of 1.0% sodium carbonate, and 200 cc. of water. The dye was dispersed with 5 cc. of 1.0% "Sulframin AB–40" solution and 200 cc. of water. Then the fabric was added to the dyebath and subsequently heated to the boil. The material was kept in the bath 2 hours at this temperature while maintaining the liquid at an approximately constant level. The dyed cloth was scoured 30 minutes at 70° C. using a bath containing 5 cc. of 1.0% "Sulframin AB–40" solution, 10 cc. of 1.0% sodium carbonate solution, and 200 cc. of water. The fabric was then rinsed and allowed to dry. Both ½% and 2% (based on the weight of fabric) dyeings were made, that is, the total weight of dyestuff in the bath was either ½% or 2% of the total weight of fabric in the bath.

"Sulframin AB–40" is sodium alkyl benzene sulfonate. "Methyl Cellosolve" is the monomethyl ether of ethylene glycol.

What is claimed is:

1. Polypropylene dyed with a dye for polypropylene selected from the group consisting of 1-(2′,4′,6′-trimethylanilino-4-hydroxyanthraquinone and 1-(2′,4′,6′-triethylanilino)-4-hydroxyanthraquinone.

2. Polypropylene dyed with the dye 1-(2′,4′,6′-trimethylanilino)-4-hydroxyanthraquinone.

3. Polypropylene dyed with the dye (2′,4′,6′-triethylanilino)-4-hydroxyanthraquinone.

References Cited

UNITED STATES PATENTS

| | | | |
|---|---|---|---|
| 3,188,163 | 6/1965 | Dehn et al. | 8—39 |
| 3,215,710 | 11/1965 | Hindermann et al. | 8—39 X |

NORMAN G. TORCHIN, *Primary Examiner.*

J. TRAVIS BROWN, *Examiner.*

T. J. HERBERT, JR., *Assistant Examiner.*